United States Patent [19]
Hauris et al.

[11] Patent Number: 5,892,772
[45] Date of Patent: Apr. 6, 1999

[54] SPATIAL REUSE BY MEANS OF DUAL HOMING ON A RING NETWORK

[75] Inventors: Jon F. Hauris, Manassas; Ronald A. Bowen, Sterling, both of Va.; Karen Parker, Los Altos, Calif.

[73] Assignees: Lockheed Martin Corporation, Bethesda, Md.; National Semiconductor Corporation, Santa Clara, Calif.

[21] Appl. No.: 839,712

[22] Filed: Apr. 15, 1997

[51] Int. Cl.$^6$ .................................................. H04J 15/00
[52] U.S. Cl. ............................................ 370/477; 370/431
[58] Field of Search ..................................... 370/400, 404, 370/405, 450, 452, 460, 468, 477, 906, 431, 401, 402, 403, 908, 904, 387, 503, 471, 464, 465, 447, 449, 451, 439, 442, 407, 408, 510, 509, 216; 375/356, 355; 340/825.05, 825.01, 825.02, 825.03, 825.16, 827, 825.6, 825.51

[56] References Cited

U.S. PATENT DOCUMENTS

| | | |
|---|---|---|
| 4,899,142 | 2/1990 | Nakayashiki et al. . |
| 4,951,280 | 8/1990 | McCool et al. . |
| 5,136,582 | 8/1992 | Firoozmand . |
| 5,150,246 | 9/1992 | Kimball et al. . |
| 5,189,414 | 2/1993 | Tawara ................................. 340/825.5 |
| 5,241,549 | 8/1993 | Ocheltree . |
| 5,295,012 | 3/1994 | Wilson et al. . |
| 5,301,303 | 4/1994 | Abraham et al. . |
| 5,422,883 | 6/1995 | Hauris et al. . |
| 5,436,898 | 7/1995 | Bowen et al. . |
| 5,475,685 | 12/1995 | Garris et al. . |
| 5,479,404 | 12/1995 | Francois et al. . |
| 5,532,937 | 7/1996 | Graziano et al. . |
| 5,617,422 | 4/1997 | Litzenberger et al. ................. 370/401 |

OTHER PUBLICATIONS

Love et al., "Concentrator Ring Protection Function," Apr. 1994 IBM TDB vol. 37, No. 05N, pp, 401 and 402.

Berger "Low Cost Concentrator Using Workstations," Apr. 1994 IBM TDB vol. 37, No. 04A, pp. 197 and 198.

Primary Examiner—Dang Ton
Attorney, Agent, or Firm—Lane,Aitken & McCann

[57] ABSTRACT

A ring network with dual homing connections to the network from one or more nodes via physically separated concentrators.

1 Claim, 1 Drawing Sheet

SPATIAL REUSE BY MEANS OF DUAL HOMING ON A RING NETWORK

BACKGROUND OF THE INVENTION

1. Field of the Invention

This invention relates to a method and apparatus for increasing the effective bandwidth of certain networks, and more particularly to a dual homing method and apparatus for increasing the bandwidth of FDDI and FDDI-II networks.

2. Description of the Prior Art

Communication networks (such as Local Area Networks and LANs) are designed to operate at a specific bandwidth. For example, Ethernet operates at 10 Mbps (Mega bits per second), while Token Ring operates at 16 Mbps, and FDDI operates at 100 Mpbs. In multimedia networking, these bandwidths are insufficient to carry the required communication, especially when multi-way multi-party networking (such as video conferencing), or high capacity networking (such as HDTV or high resolution medical imaging) is to be conducted. In particular, once the bandwidth of the network is used up, no additional users can participate until someone else gives up their portion of the bandwidth.

As will be appreciated by those skilled in the art, it would be desirable to extend the usage of the existing network bandwidth, particularly without changing the physical, signal layer specified and standardized by the national standards organizations (e.g. ANSI, IEEE, or CCITT). This means that the network remains compatible at a hardware level and at a low layer (OSI layer 1, 2, and 3) software layers.

Extending the usage of a network's bandwidth, would permit many more users to be active on the network, that is, in effect, increasing the capacity of a network. For example, if the effective bandwidth of a FDDI network was increased from 100 Mbps to 500 Mbps, then five times the information can be carried over the network; for example, five times the number of users could log onto the network.

U.S. patent application Ser. No. 08/801,379 filed Feb. 19, 1997 concurrently with this application, entitled Multimedia Application Synchronization Over Isochronous Newworks, assigned to the assignee of this application, and incorporated herein by reference, discloses a novel method of bandwidth sharing in which spatial domains are defined in a client/server architecture by coupling the server to two or more spaced apart points on the network. This invention relates to a unique and innovative method for managing, controlling, and establishing spatial reuse domains on a ring network in order to increase the effective bandwidth of the network.

BRIEF DESCRIPTION OF THE INVENTION

An object of this invention is the provision of a method to provide increased bandwidth on a ring network in order to allow for multimedia network communications, such as for example, two-way video conferencing.

Briefly, this invention contemplates the provision of a ring network with dual homing connections via physically separated concentrators to the network from one or more nodes. Communication adapters, which attach to a ring network, include a function called the Media Access Control (MAC). The MAC is responsible for transmitting and receiving data to and from the ring network. Typically, a communication adapter will have a single MAC. However, if a communication adapter is provided with two MACs, then this adapter may be attached to two points on the network. In this case, the communication adapter cannot attach directly to the network but must be attached to the network through two concentrators, one concentrator for each MAC. This configuration is known in the art as dual homing. A concentrator is a device that attaches directly to the ring network and permits multiple communication adapters to be attached at a single point. The concentrator essentially expands the ring at that point.

With the concentrators physically (spatially) separated, attached at different locations on the network, and a single dual MAC adapter attached to these spatial separated concentrators, this dual MAC adapter can reuse the same bandwidth at each concentrator location, if each concentrator is in a separate spatial domain and the boundaries of these domains do not overlap. Thus, by a strategic placement of concentrators and by allocating a specific spatial domain to each concentrator, all bandwidths can be reused; specifically, an adapter that is dual homed attached to these two concentrators can reuse all the bandwidth at each concentrator.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE PREFERRED EMBODIMENTS

Figure 1:
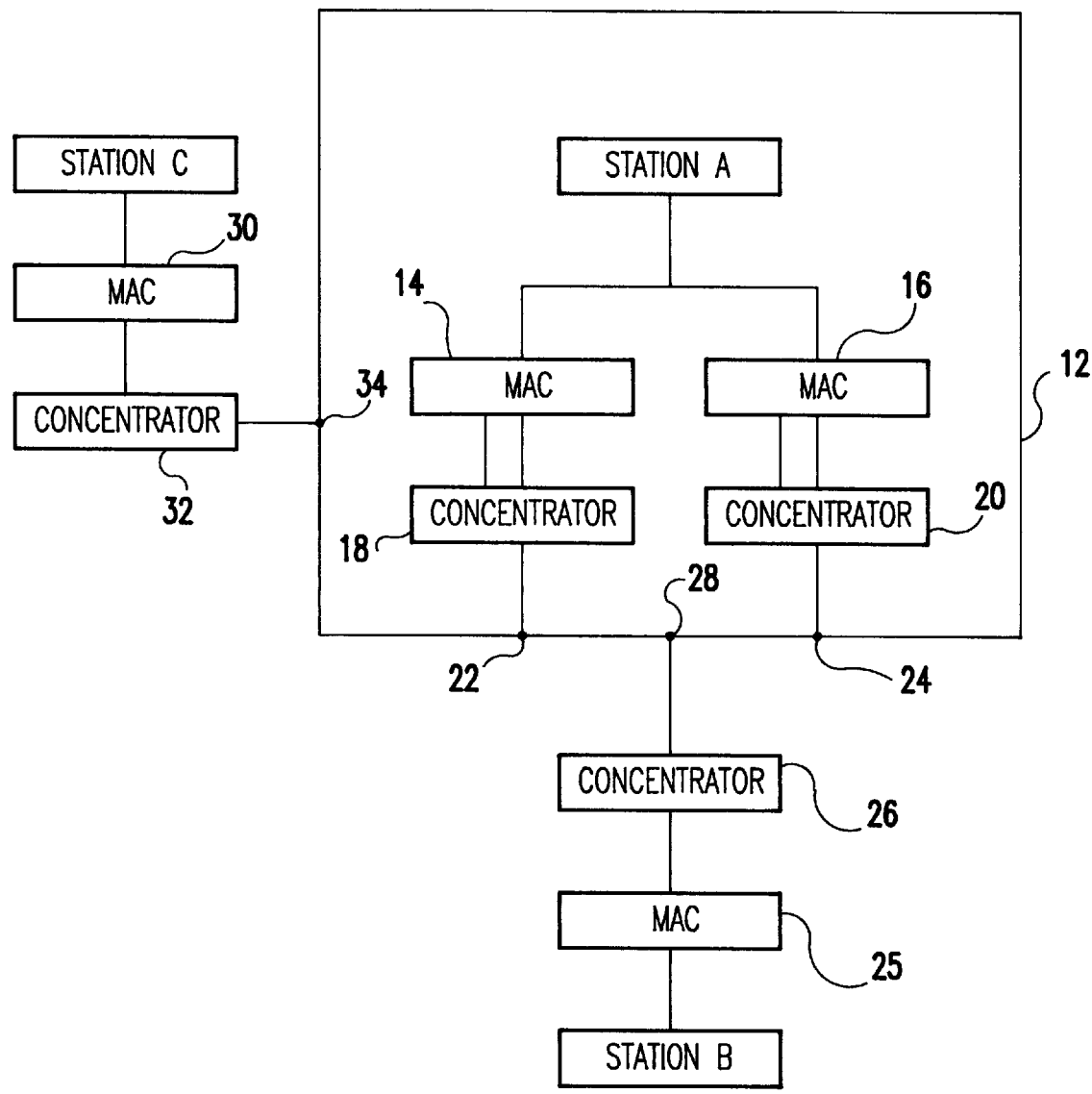
FIG. 1 is a block diagram of a specific embodiment of a ring network using dual homing connections in accordance with the teachings of the invention in order to expand the effective bandwidth of the network.

Referring now to FIG. 1, in this specific embodiment of the invention, a video conference conferencing system links three participants over an FDDI-II network 12. The participants are located at stations designated in the drawing as station A, station B, and station C. As will be appreciated by those skilled in the art, FDDI-II is a high-performance, fiber optic, token ring LAN running at 100 MBS. FDDI-II is a successor to FDDI with a modification to handle synchronous circuit-switched pulse code modulated (PCM) data for voice or ISDN traffic, in addition to ordinary data. In addition to regular (asynchronous) frames for ordinary data, special frames are permitted for isochronous circuit switched data. These frames are generated every 125 microseconds by a master station. The FDDI-II cycle structure is defined in Section 5 of the ANSI FDDI Hybrid Ring Control standard (X3T9/89-43 Rev 6.3) and incorporated herein by reference. Each new cycle consists of control and data bytes or octets. The master station adjusts the latency of the FDDI-II ring so that there are always an integral number of these frames or cycles on the ring. Each frame is partitioned into four parts: a preamble, a cycle header, a dedicated packet group, and 16 wideband channel (WBC) cyclic groups. Each WBC can be dynamically allocated to either isochronous or packet data use. For isochronous use, each wideband channel provides 6.144 Mbps of bandwidth, and consists of 96 octets interleaved across the cycle. Once a station has acquired one or more time slots in a frame, those slots are reserved for it until they are explicitly released. The allocation of bandwidth to isochronous users is defined in Section 9.3 of the ANSI FDDI Station Management-2 Isochronous Services (SMT-2-IS) standard (X3T9/93-122 Rev 3.0).

In this embodiment, station A is connected to the network through an adaptor comprised of two separate layers of FDDI-II Media Access Control (MAC) designated here as 14 and 16 and concentrators 18 and 20. Concentrator 18 connects the MAC 14 to a point 22 on the ring 10, and concentrator 20 connects the MAC 16 to a point 24 on the ring 10; point 24 is physically separated from the point 22 (i.e. dual homed).

In this exemplary embodiment of the invention, a single MAC layer 25 and a concentrator 26 connect the station B to the network 10 at a point 28 which is between points 22 and 24 to which station A is dual homed. A single MAC 30 and a concentrator 32 connect station C to the ring network 10 at a point 34.

Thus, it will be appreciated that for the FDDI-II network 12, the bandwidth for isochronous communication in the frame generated every 125 microseconds by an FDDI-II control station may be reused to provide full duplex communication between participant stations A, B, and C. The network channel reserved for communication between station A and station B (e.g. communication between points 22 and 28) may be reused to communicate between station A and station C (e.g. communication between points 24 and 34) owing to the dual homing connection of station A to two physically separated points on the network 12. In this relatively simple example of the invention, the reused network channel reserved both for communication between station A and station B and between station A and station C, cannot be reused for communication between station C and station B. By dual homing the stations B and C to the network 12, a single network channel can be spatially reused for communication among stations A, B, and C.

The invention can be extended beyond dual homing to encompass multiple homing adapters and thus accommodate multiple spatial domains with a corresponding spatial reuse of channels among all the domains. Each domain would be defined by a concentrator and an attachment to a multiple homing adapter. The arrangement only needs to ensure that no nesting or overlapping of spatial domains occurred. In order to implement the spatial reuse concept on a ring network like FDDI, a management agent software keeps a logical and physical ring map (which is part of the FDDI standards) and allocates the channels based on spatial grouping. This management agent software determines the physical ring map, the spatial groupings, the nesting between the groupings, and allocates the channels based on the independent groups. In this context, independent refers to groups that are not nested. It should be noted, if there are no nested groups, then all groups may be assigned the same single channel. For each nesting of groups an additional channel allocation will have to be provided (one for each nest and/or each level of nesting). Thus, it can be seen that by using spatial reuse, the bandwidth of a ring network can be enormously extended.

These and other modifications may be made to the specific embodiment of the invention without departing from the spirit and scope of the invention.

We claim:

1. In a network for transmitting isochronous data in which network a communication channel between two nodes is established by reserving bandwidth in a frame and once established said band width is reserved until explicitly relinquished, and in which network each transmitting node can strip a frame of data it had previously transmitted when the transmitted frame returns to the transmitting node, a system for attaching nodes to said network, comprising in combination:

a first node connected to said network at a first point via a first media access controller and a first concentrator;

said first node connected to said network at a second point via a second media access controller and a second concentrator;

a second node connected to said network at a point between said first point and said second point;

a third node connected to said network at a point outside of said first point and said second point whereby said first node can transmit data in a channel reserved for communication between said first node and said second node from said first point and can reuse said channel reserved for communication between said first node and said second node to transmit data from said second point to said third node.

* * * * *